United States Patent
Chen et al.

(10) Patent No.: US 9,568,814 B2
(45) Date of Patent: Feb. 14, 2017

(54) SELF CLEANING AIR FILTER MODULE AND PROJECTION DEVICE USING THE SAME

(75) Inventors: Jhih-Hao Chen, Hsin-Chu (TW); Jia-Hong Dai, Hsin-Chu (TW); Tsung-Ching Lin, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 461 days.

(21) Appl. No.: 13/587,054

(22) Filed: Aug. 16, 2012

(65) Prior Publication Data
US 2013/0169942 A1 Jul. 4, 2013

(30) Foreign Application Priority Data
Jan. 4, 2012 (CN) .......................... 2012 1 0000818

(51) Int. Cl.
| | | |
|---|---|---|
| *G03B 21/16* | (2006.01) | |
| *H04N 9/31* | (2006.01) | |
| *B01D 29/00* | (2006.01) | |
| *B01D 33/54* | (2006.01) | |
| *B01D 29/72* | (2006.01) | |
| *B01D 33/52* | (2006.01) | |
| *B01D 29/70* | (2006.01) | |

(52) U.S. Cl.
CPC ........... *G03B 21/16* (2013.01); *B01D 29/0084* (2013.01); *B01D 29/0086* (2013.01); *B01D 29/70* (2013.01); *B01D 29/72* (2013.01); *B01D 33/52* (2013.01); *B01D 33/54* (2013.01); *H04N 9/3144* (2013.01); *B01D 2279/45* (2013.01); *B01D 2311/106* (2013.01); *B01D 2321/30* (2013.01)

(58) Field of Classification Search
CPC ... G03B 21/16; H04N 9/3144; B01D 2279/45; B01D 2311/106; B01D 29/0084; B01D 29/0086; B01D 29/70; B01D 29/72; B01D 33/52; B01D 33/54; B01D 2321/30
USPC ... 353/52, 53, 54, 55, 56, 57, 58, 59, 60, 61
See application file for complete search history.

(56) References Cited

U.S. PATENT DOCUMENTS

| | | | | |
|---|---|---|---|---|
| 5,681,363 | A * | 10/1997 | Tucker ................... | B01D 46/02 55/293 |
| 6,117,200 | A * | 9/2000 | Berg et al. ....................... | 55/287 |
| 7,161,315 | B2 | 1/2007 | Hsu | |
| 7,320,524 | B2 * | 1/2008 | Lee ...................... | H04N 9/3141 312/10.1 |

(Continued)

FOREIGN PATENT DOCUMENTS

| | | |
|---|---|---|
| CN | 1945150 | 4/2007 |
| CN | 201689261 | 12/2010 |

(Continued)

OTHER PUBLICATIONS

China Patent Office, "Office Action". Oct. 10, 2014.

*Primary Examiner* — Bao-Luan Le
(74) *Attorney, Agent, or Firm* — WPAT, PC; Justin King; Douglas Hosack

(57) ABSTRACT

An air filter module adapted to be used with a projection module and disposed to cover an air vent of the projection module. The air filter module includes a filter component and a cleaning unit. The cleaning unit is disposed to cover the air vent and configured to drive the filter component to have a movement so as to remove the dust on the filter component according to a cleaning-start signal. A projection device adopting the air filter module is also provided.

20 Claims, 7 Drawing Sheets

(56) References Cited

U.S. PATENT DOCUMENTS

| | | | |
|---|---|---|---|
| 7,527,680 B2* | 5/2009 | Horiguchi et al. | 96/422 |
| 7,535,711 B2* | 5/2009 | Saegusa et al. | 361/695 |
| 7,621,643 B2* | 11/2009 | Hirosawa et al. | 353/58 |
| 7,677,962 B2* | 3/2010 | Chang | 454/184 |
| 7,753,533 B2* | 7/2010 | Kaneko | 353/61 |
| 8,172,406 B2* | 5/2012 | Yamagishi | 353/61 |
| 8,292,980 B2* | 10/2012 | Yamagishi et al. | 55/354 |
| 8,317,337 B2* | 11/2012 | Watanabe | G03B 21/16 353/57 |
| 8,388,144 B2* | 3/2013 | Uozaki | G03B 21/16 353/57 |
| 8,465,156 B2* | 6/2013 | Nakashita | 353/58 |
| 8,562,144 B2* | 10/2013 | Nakajima et al. | 353/61 |
| 8,696,138 B2* | 4/2014 | Nishihata et al. | 353/57 |
| 2003/0095237 A1* | 5/2003 | Terami et al. | 353/57 |
| 2005/0081495 A1* | 4/2005 | Wei | B01D 46/22 55/290 |
| 2005/0254021 A1* | 11/2005 | Lee | H04N 9/3141 353/119 |
| 2006/0017889 A1* | 1/2006 | Ishii et al. | 353/57 |
| 2006/0209267 A1* | 9/2006 | Hirosawa et al. | 353/58 |
| 2007/0085976 A1 | 4/2007 | Yang et al. | |
| 2007/0207721 A1* | 9/2007 | Chang | 454/184 |
| 2009/0009728 A1* | 1/2009 | Liu et al. | 353/57 |
| 2010/0007856 A1* | 1/2010 | Fujisaki et al. | 353/52 |
| 2010/0026967 A1* | 2/2010 | Yamagishi | 353/61 |
| 2010/0033688 A1* | 2/2010 | Obama et al. | 353/61 |
| 2010/0128230 A1* | 5/2010 | Kotaka | G03B 21/145 353/57 |
| 2010/0225888 A1* | 9/2010 | Watanabe | G03B 21/16 353/52 |
| 2011/0109883 A1* | 5/2011 | Ito | 353/61 |
| 2011/0279069 A1* | 11/2011 | Murata | 318/128 |
| 2012/0008100 A1* | 1/2012 | Tani et al. | 353/58 |
| 2013/0298773 A1* | 11/2013 | Yamagishi et al. | 96/15 |

FOREIGN PATENT DOCUMENTS

| | | |
|---|---|---|
| CN | 201930657 | 8/2011 |
| CN | 102238821 | 11/2011 |
| CN | 102243422 | 11/2011 |
| CN | 102279620 | 12/2011 |
| JP | 2008116158 A | 5/2008 |
| JP | 2011170270 A * | 9/2011 |

* cited by examiner

SELF CLEANING AIR FILTER MODULE AND PROJECTION DEVICE USING THE SAME

TECHNICAL FIELD

The invention relates to a projection device, and more particularly to a projection device capable of cleaning an air filter therein.

BACKGROUND

In recent years, the light bulb power or system thermal density in the present projection devices keeps rising due to the increasing demand for the high-brightness projection devices. In a projection device, not only the light bulbs, electronic components and power supply generate heat and thereby resulting in a high temperature while the projection device is being in use, the optical elements may also result in a high temperature while being emitted by light beams. To reduce the temperature, most of the existing projection devices are equipped with one or more axial fans or blowers for cooling the components in the projection device. However, in a high-dust environment, the airflow caused by the axial fan or blower may introduce the external dust into the inside of the projection device; and thus, the components in the projection device may have dust thereon.

Therefore, some projection devices, such as the ones disclosed in U.S. Pat. No. 7,161,315, U.S. patent publication No. 2007/0245701, U.S. patent publication No. 2007/0085976 and U.S. patent publication No. 2010/0077926 and Taiwan patents publication No. 200717163 and Taiwan patent No. 1247190, are equipped with a filter so as to prevent the dust from adhering to the internal elements of the projection devices.

However, after the filter used for a period of time, dust may block the meshes of the filter and consequently reduce the flow rate of airflow into the projection device, and thereby resulting in the projection device having a poor cooling efficiency.

SUMMARY OF EMBODIMENTS

Therefore, one object of the invention is to provide an air filter module including a filter component and a cleaning unit. The cleaning unit is configured to remove the dust on the filter component.

Another object of the invention is to provide a projection device capable of cleaning an air filter module thereof so as may be used more conveniently.

An embodiment of the invention provides an air filter module adapted to be used with a projection module and disposed to cover an air vent of the projection module. The air filter module includes a filter component and a cleaning unit. The cleaning unit is disposed to cover the air vent and configured to drive the filter component to have a movement according to a cleaning-start signal.

In one embodiment according to the invention, the cleaning unit includes a block component and a driving force generation assembly. The block component is configured to limit the movement of the filter component. The driving force generation assembly includes a drive unit and a movement unit. The movement unit is disposed between the drive unit and the block component. A driving force is generated between the drive unit and the movement unit for driving the movement unit to have the movement for making the filter component vibrate.

In one embodiment according to the invention, the drive unit includes at least one electromagnet. The movement unit includes at least one magnetic device corresponding to the electromagnet(s). Each magnetic device is disposed between the filter component and the corresponding electromagnet. The driving force is a magnetic force generated by an interaction between the electromagnet(s) and the magnetic device(s) corresponding to the electromagnet(s).

In one embodiment according to the invention, the drive unit includes at least one electromagnet. The movement unit includes at least one magnetic device corresponding to the electromagnet(s). The driving force generation assembly further includes at least one track corresponding to the electromagnet(s). Each track is disposed between the filter component and the corresponding electromagnet. Each magnetic device is disposed in the corresponding track.

In one embodiment according to the invention, each track comprises a tubular structure.

In one embodiment according to the invention, the aforementioned air filter module further includes at least one gasket. Each gasket is disposed between the filter component and the corresponding track.

In one embodiment according to the invention, the drive unit includes at least one electromagnet. The movement unit includes at least one metal device corresponding to the electromagnet(s). Each metal device is disposed between the corresponding electromagnet and the filter component. The driving force generation assembly further includes at least one elastic component corresponding to the electromagnet(s). Each elastic component is connected between the corresponding electromagnet and the corresponding metal device.

In one embodiment according to the invention, the aforementioned air filter module further includes at least one drive electromagnet fixed to the block component.

In one embodiment according to the invention, the drive unit includes at least one first electromagnet. The movement unit includes at least one first metal surface corresponding to the first electromagnet(s) and at least one second metal surface corresponding to the drive electromagnet(s). The filter component has a first surface and a second surface, and the first surface and the second surface are opposite to each other. The first surface faces to the first electromagnet(s). The second surface faces to the drive electromagnet(s). The first metal surface(s) is(are) disposed on the first surface of the filter component. The second metal surface(s) is(are) disposed on the second surface of the filter component.

In one embodiment according to the invention, the filter component includes a filter and a frame surrounding the filter.

In one embodiment according to the invention, the aforementioned air filter module further includes a fan and a control unit. The control unit is electrically connected to the fan and configured to control a rotation direction of the fan.

In one embodiment according to the invention, the movement unit is a collision component connected to the drive unit. The drive unit is configured to drive the collision component to collide or contact with the filter component to generate a driving power. The driving power makes the filter component have a vibration; the driving power is the driving force.

In one embodiment according to the invention, the aforementioned air filter module further includes an elastic component disposed between the drive unit and the filter component, and the elastic component generates elasticity in response to the driving force.

An embodiment of the invention further provides a projection device, and the projection device includes a projection module and the aforementioned air filter module.

In summary, because the air filter module of the invention includes the cleaning unit for generating collisions between the filter component and the cleaning unit, the dust accumulated on the filter component may be efficiently removed. In addition, because the projection device of the invention adopts the air filter module, an automatic dust removing function is provided and accordingly the usage convenience may be improved.

BRIEF DESCRIPTION OF THE DRAWINGS

The above embodiments become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
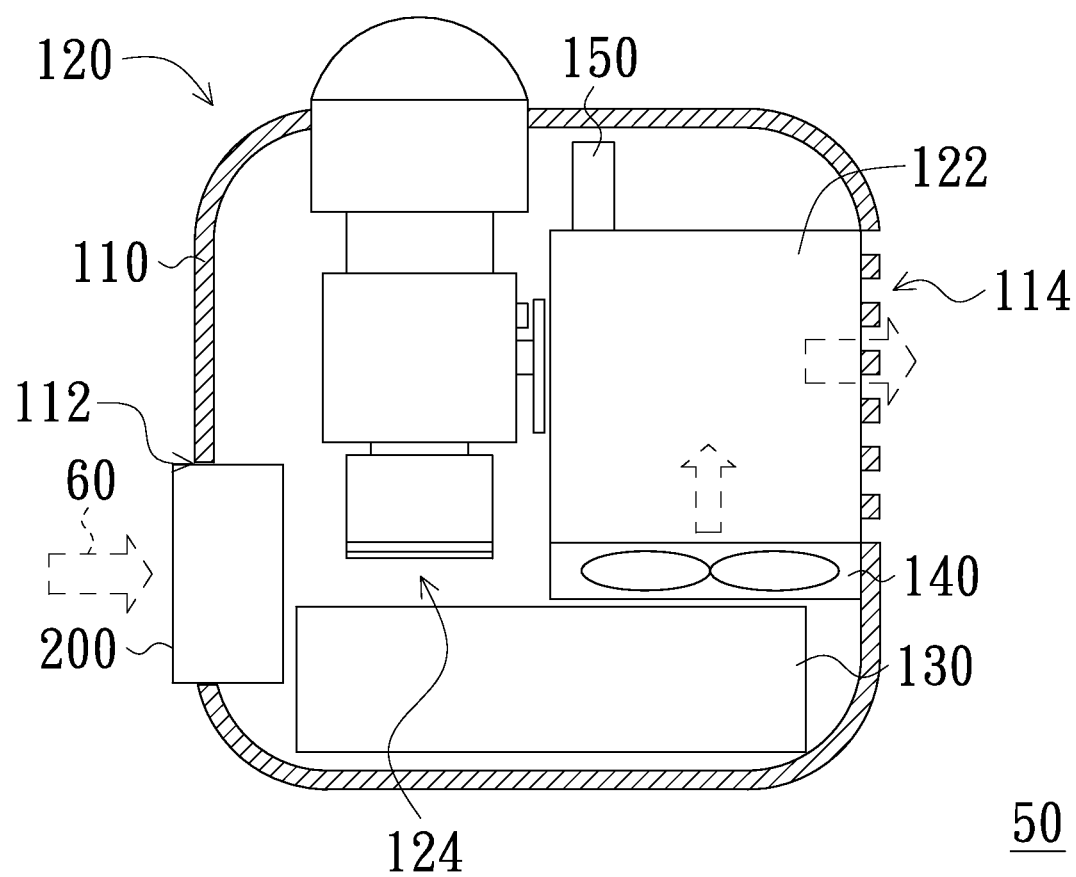
FIG. 1 is a schematic cross-sectional view of a projection device in accordance with an embodiment of the invention.

Referring to FIG. 1, the projection device 50 includes a projection module 120 and an air filter module 200. The projection module 120 has an air vent 112, and the air filter module 200 is disposed to cover the air vent 112. Specifically, the projection module 120 includes a housing 110. The air filter module 200 may be disposed in the inside of the housing 110, the outside of the housing 110, or extended from the outside to the inside of the housing 110. The projection module 120 further includes a light source area 122 and an optical engine 124. A light source (not shown) of the light source area 122 is configured to provide illumination beam to the optical engine 124, and the optical engine 124 is configured to convert the illumination beam into image beam and project the image beam onto a screen and thereby forming an image. The optical engine 124 includes a light valve (not shown) for converting the illumination beam into the image beam, a projection lens (not shown) for projecting the image beam onto the screen thereby forming images, and other associated optical components. A power supply 130 and cooling fans 140 and 150 dissipated heat are disposed in the housing 110; wherein the fan 140 may be an axial fan and the fan 150 may be a blower, and no limitation. The operations of the fans 140 and 150 is valuable to generating airflow 60 for introducing the external cool air into the inside of the housing 110 through the air vent 112; and accordingly, the internal hot air is exhausted through another air vent 114 of the housing 110; and thus, the effect of dissipating heat is obtained. The air filter module 200 may filter the dust in the airflow 60 to prevent the dust from entering into the inside of the housing 110.

To prevent the accumulated dust from blocking the mesh of the air filter module 200 resulting in the deterioration of the dissipating heat efficiency of the projection device 50, the air filter module 200 according to the embodiment is designed to have an automatic dust-removing function. The air filter module 200 will be described in detail in the following with a reference of associated figures.

Figure 2:
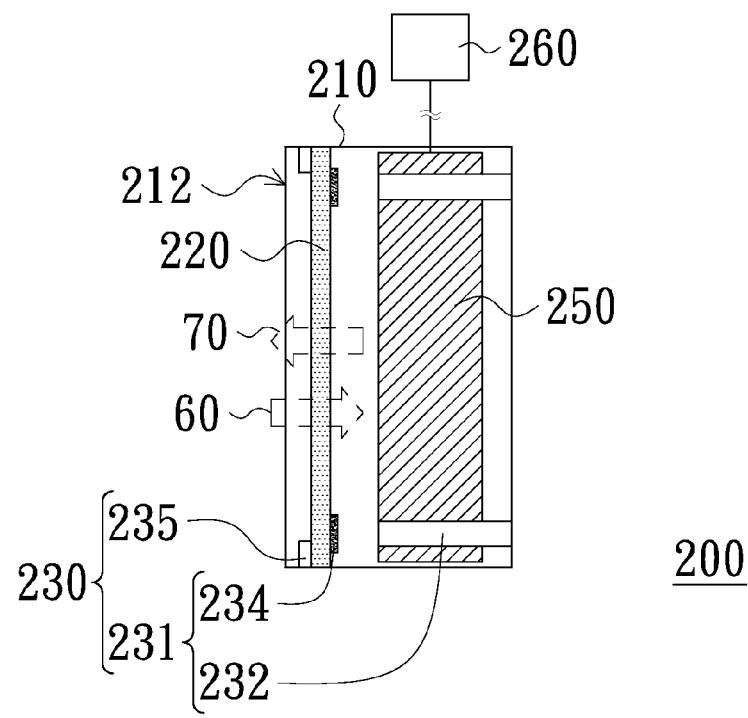
FIG. 2 is a schematic cross-sectional view of an air filter module in accordance with an embodiment of the invention.
Figure 3:
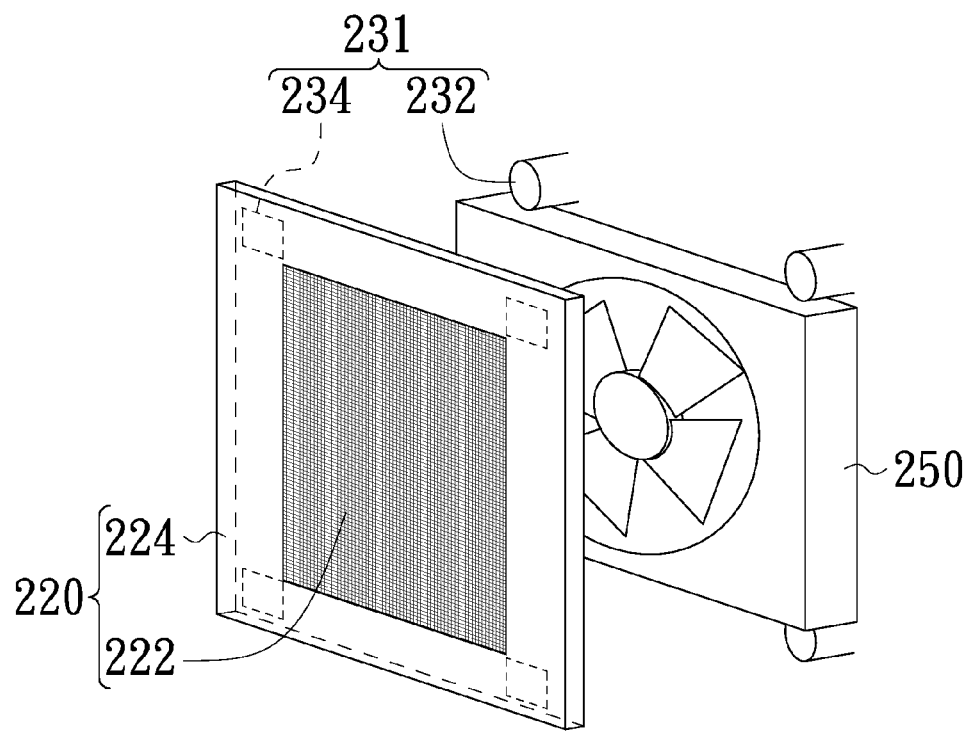
FIG. 3 is a schematic three-dimensional view of the air filter module shown in FIG. 2.

Referring to FIG. 2 and FIG. 3, the air filter module 200 includes a filter component 220 and a cleaning unit 230. The filter component 220 and the cleaning unit 230 are, for example, disposed in the housing 210 of the air filter module 200, and no limitation. In the embodiment, the cleaning unit 230 is arranged to cover the air vent 112 and configured to drive the filter component 220 to have a vibration according to a cleaning-start signal (described in detail later). To be short, the cleaning unit 230 of the embodiment may result in a collision between the cleaning unit 230 and the filter component 220.

The cleaning unit 230 includes a driving force generation assembly 231. The driving force generation assembly 231 includes a drive unit 232 and a movement unit 234. The movement unit 234 is connected to the filter component 220, and a driving force is generated between the drive unit 232 and the movement unit 234 and accordingly the filter component 220 is vibrated. Specifically, the filter component 220 includes, for example, a filter 222 and a frame 224; wherein the filter 222 is disposed to be fixed to and surrounded by the frame 224. In one embodiment, the filter 222 is, for example, a removable filter, and thus it is much convenient while needing a replacement for a damaged filter 222. In the embodiment, the drive unit 232 includes, for example, a plurality of electromagnets, and the movement unit 234 includes, for example, a plurality of magnetic devices (for example, permanent magnets) corresponding to the electromagnets. The drive unit 232 is, for example, fixed to the housing 210 and may be fixed to be immovable. The movement unit 234 may be disposed on the frame 224 of the filter component 220. In the embodiment, the drive unit 232 is exemplified by having a plurality of electromagnets and the movement unit 234 is exemplified by having a plurality of magnetic devices; however, it is to be noted that the invention does not limit the number of the electromagnet and the magnetic device. In other words, the number of the electromagnet and the magnetic device may be one in other embodiment. In addition, the cleaning unit 230 may further include a block component 235, and the block component 235 may be fixed in the housing 210 and configured to stop the filter component 220. In another embodiment, the block component 235 and the housing 210 may have a one-piece structure. In still another embodiment, a sidewall 212 of the housing 210 may serve as the block component 235 for stopping the filter component 220.

In the embodiment, the filter component 220 is configured to be cleaned through the cleaning unit 230 while accumulating dust thereon. Specifically, when the filter component 220 is cleaned, a first current is configured to supply to the electromagnets of the drive unit 232 according to the cleaning-start signal so as to generate attraction magnetic force between the electromagnets of the drive unit 232 and the magnetic devices of the movement unit 234. And thus, the movement unit 234 is attracted toward the drive unit 232; and due to the filter component 220 is connected to the movement unit 234 and the filter component 220 is fixed to the movement unit 234, the filter component 220 as well as the drive unit 232 may move. Consequently, the dust falls from the filter 222 of the filter component 220 when the movement unit 234 is attracted toward the drive unit 232 and the movement unit 234 the drive unit 232 collide. In addition, once the movement unit 234 and the drive unit 232 collide, a second current is configured to supply to the electromagnets of the drive unit 232 so as to generate repulsion magnetic force between the electromagnets of the drive unit 232 and the magnetic devices of the movement unit 234. And thus, the movement unit 234 as well as the filter component 220 may be driven to move away from the drive unit 232 until, the filter component 220 collides with the block component 235, and the dust falls from the filter 222 of the filter component 220. In the embodiment, the cleaning-start signal may be issued by a user's trigger or by a control unit based on the operation hours of the projection device 50 (or, the projection module 120), and no limitation.

Therefore, through repeating the aforementioned operation steps, the air filter module 200 may efficiently and automatically remove the dust on the filter component 220, and thus, the usage convenience of the projection device 50 shown in FIG. 1 may be improved.

As shown in FIGS. 2 and 3, the air filter module 200 further includes a fan 250 and a control unit 260. The fan 250 is, for example, disposed in the housing 210. The control unit 260 is electrically connected to the fan 250 and configured to control the rotation direction of the fan 250. The control unit 260 may be integrated into, or electrically connected to, a control unit (not shown) of the projection device 50 shown in FIG. 1. When the projection device 50 is configured to perform an image projection, the control unit 260 is configured to control the fan 250 to rotate along a first direction (for example, clockwise), so as to generate the airflow 60 and thereby introducing the external air into the inside of the projection device 50 through the filter component 220. Alternatively, when the filter component 220 is cleaned, the control unit 260 is configured to control the fan 250 to rotate along a second direction (for example, counter-clockwise) opposite to the first direction, so as to produce the airflow 70 and thereby flowing the dust on the filter 222 of the filter component 220 toward the outside of the housing 210. In the embodiment, the drive unit 232 is, for example, directly fixed to the housing 210; however, the drive unit 232 may be fixed to the fan 250 in another embodiment.

Figure 4:
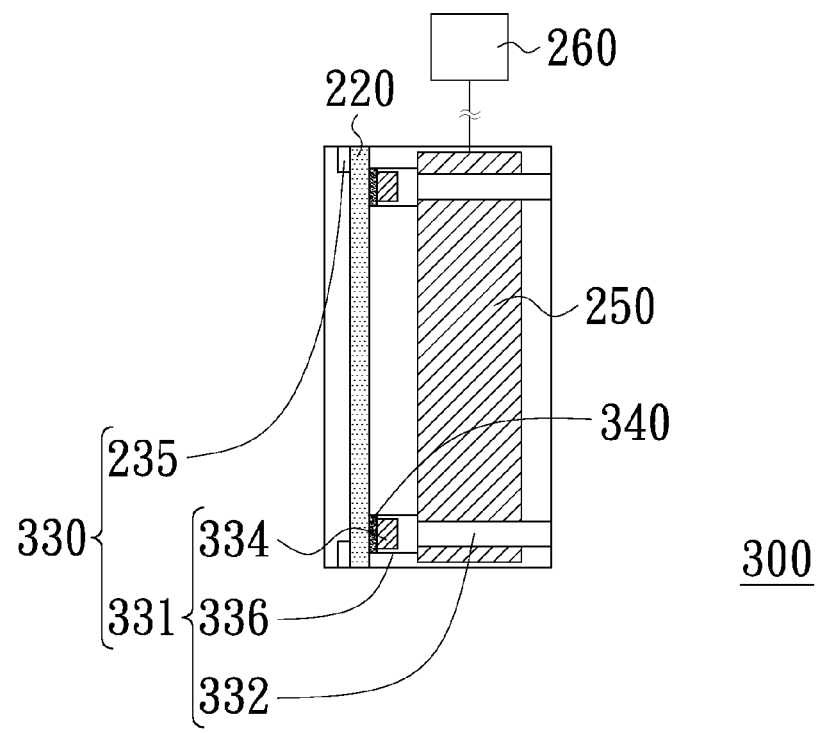
FIG. 4 is a schematic cross-sectional view of an air filter module in accordance with another embodiment of the invention.
Figure 5:
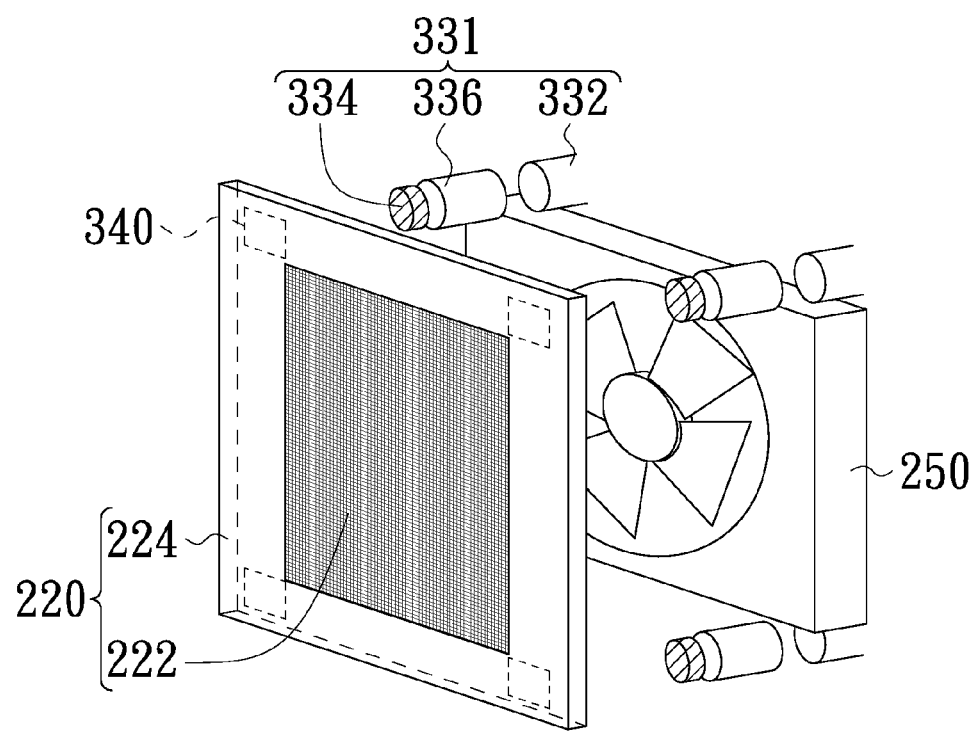
FIG. 5 is a schematic three-dimensional view of the air filter module shown in FIG. 4.

Referring to FIG. 4 and FIG. 5, the air filter module 300 in the embodiment is similar to the aforementioned air filter module 200 of FIG. 2; the main difference is the driving force generation assembly. In the cleaning unit 330 of the air filter module 300 according to the embodiment, the driving force generation assembly 331 includes a drive unit 332, a movement unit 334, and a track 336. The drive unit 332, same as the aforementioned drive unit 232, includes at least one electromagnet, and the drive unit 332 in the embodiment is exemplified by having a plurality of electromagnets. In addition, the movement unit 334 includes at least one magnetic device corresponding to the electromagnet(s), and the movement unit 334 in the embodiment is exemplified by having a plurality of magnetic devices. The movement unit 334 is disposed between the filter component 220 and the drive unit 332. The number of the track 336 is, for example, corresponding to the number of the electromagnet. Each track 336 is disposed between the corresponding electromagnet and the filter component 220, and each magnetic device is disposed on the corresponding track 336. That is, these magnetic devices of the movement unit 334 may move in the tracks 336. In the embodiment, each track 336 is, for example, a tubular structure, and no limitation.

In the embodiment, the filter component 220 may be cleaned through the cleaning unit 330 while having accumulated dust thereon. Specifically, when the filter component 220 is cleaned, a first current is configured to supply to the electromagnets of the drive unit 332 according to the cleaning-start signal so as to generate attraction magnetic force between the electromagnets and the magnetic devices of the movement unit 334. And thus, the movement unit 334 may be driven to move toward the drive unit 332 along the track 336. Then, a second current with the current direction opposite to the current direction of the first current is configured to supply to the electromagnets of the drive unit 332 so as to generate repulsion magnetic force between the electromagnets and the magnetic devices of the movement unit 334. And thus, the movement unit 334 may be driven to move away from the drive unit 332 along the track 336.

Accordingly, the dust falls from the filter 222 of the filter component 220 when the movement unit 334 and the filter component 220 collide. Therefore, through repeating the aforementioned operation steps, the air filter module 300 may automatically remove the dust on the filter component 220; and thus, the air filter module 300 according to the embodiment may automatically remove the dust on the filter component 220 efficiently.

In addition, the air filter module 300 in the embodiment may further include at least one gasket 340; wherein the number of gasket 340 is, for example, corresponding to the number of the electromagnet. Each gasket 340 is disposed between its associated track 336 and the filter component 220 and configured to be collided by the magnetic device. In the embodiment, the gasket(s) 340 is(are), for example, fixed to the filter component 220 in order to prevent the filter component 220 from damage by a collision of the magnetic device.

Figure 6:
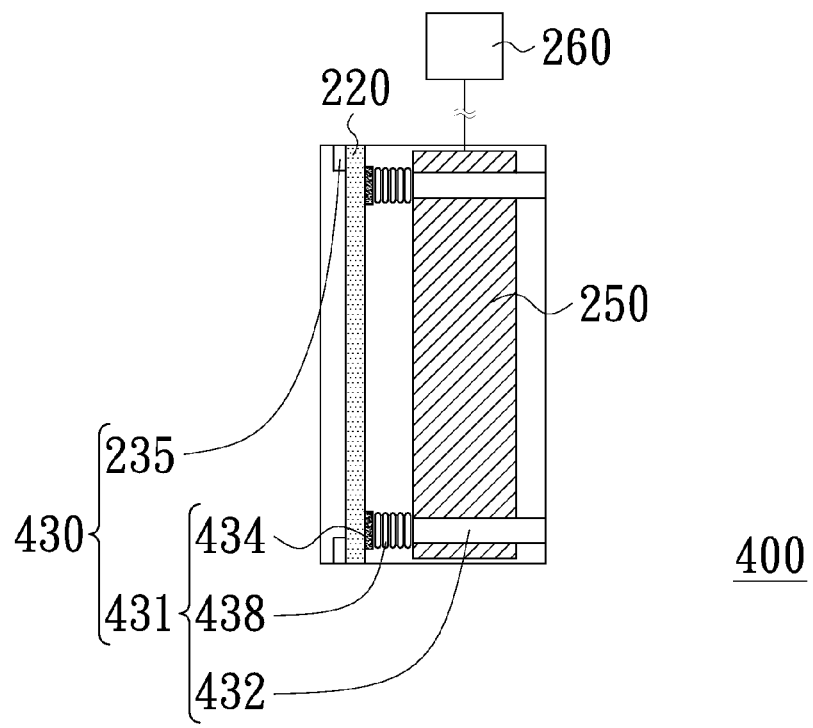
FIG. 6 is a schematic cross-sectional view of an air filter module in accordance with another embodiment of the invention.
Figure 7:
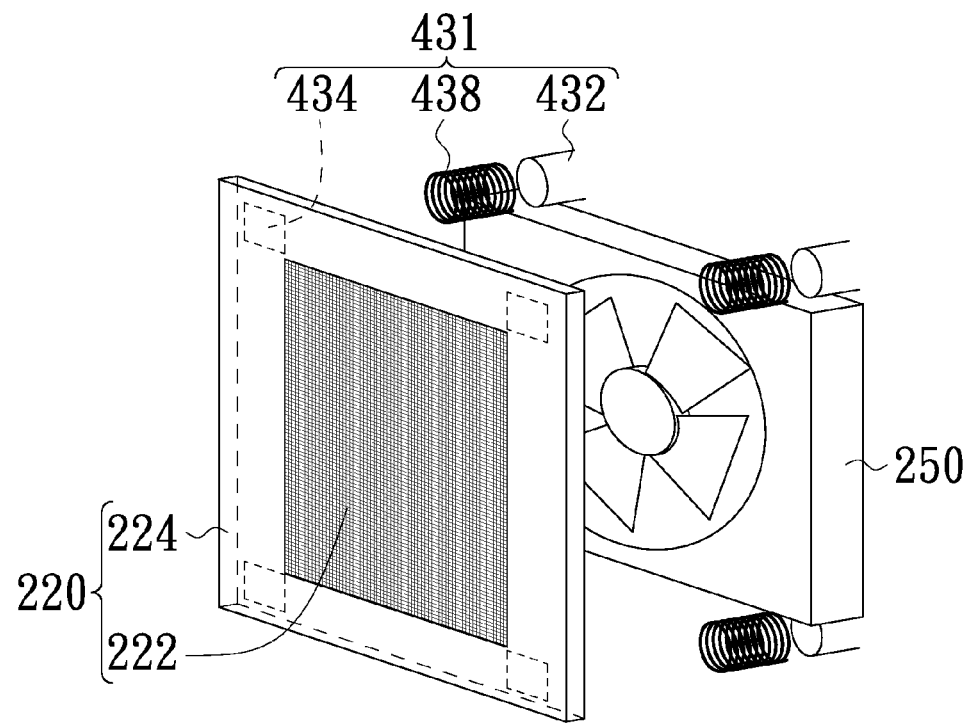
FIG. 7 is a schematic three-dimensional view of the air filter module shown in FIG. 6.

Referring to FIG. 6 and FIG. 7, the air filter module 400 in the embodiment is similar to the aforementioned air filter module 200; the main difference is the driving force generation assembly. In the cleaning unit 430 of the air filter module 400 according to the embodiment, the driving force generation assembly 431 includes a drive unit 432, a movement unit 434, and an elastic component 438. The drive unit 432, same as the aforementioned drive unit 232, includes at least one electromagnet; wherein the drive unit 432 in the embodiment is exemplified by having a plurality of electromagnets. In addition, the movement unit 434 includes at least one metal device corresponding to the electromagnet(s); wherein metal device of the movement unit 434 in the embodiment is exemplified by having a plurality of metal devices. The metal device(s) is(are) disposed on the filter component 220 and the movement unit 434 is disposed between the filter component 220 and the drive unit 432. The number of the elastic component 438 is, for example, corresponding to the number of the electromagnet. Each elastic component 438 is connected between the corresponding electromagnet and the corresponding metal device. In the embodiment, the elastic component 438 is, for example, a spring, or may be in other types of device having flexibility feature.

In the embodiment, the filter component 220 is configured to be cleaned through the cleaning unit 430 while having accumulated dust thereon. Specifically, when the filter component 220 is cleaned, a current is configured to supply to the electromagnets of the drive unit 432 according to the cleaning-start signal so as to generate a magnetic field to attract the metal device(s) of the movement unit 434. And thus, the movement unit 434 may be attracted toward the drive unit 432 and the filter component 220 as well as the movement unit 434 may move, and the elastic component 438 is compressed. Then, the current is stopped to be supplied to the electromagnets and accordingly the magnetic field between the electromagnets and the metal devices disappears. And thus, the compressed elastic component 438 drives the movement unit 434 as well as the filter component 220 to move away from the drive unit 432 until the filter component 220 and the block component 235 collide. Accordingly, the dust falls from the filter 222 of the filter component 220 when the filter component 220 and the block component 235 collide.

Therefore, through repeating the aforementioned operation steps, the air filter module 400 may automatically remove the dust on the filter component 220; and thus, the air filter module 400 according to the embodiment may automatically remove the dust on the filter component 220 efficiently.

Figure 8:
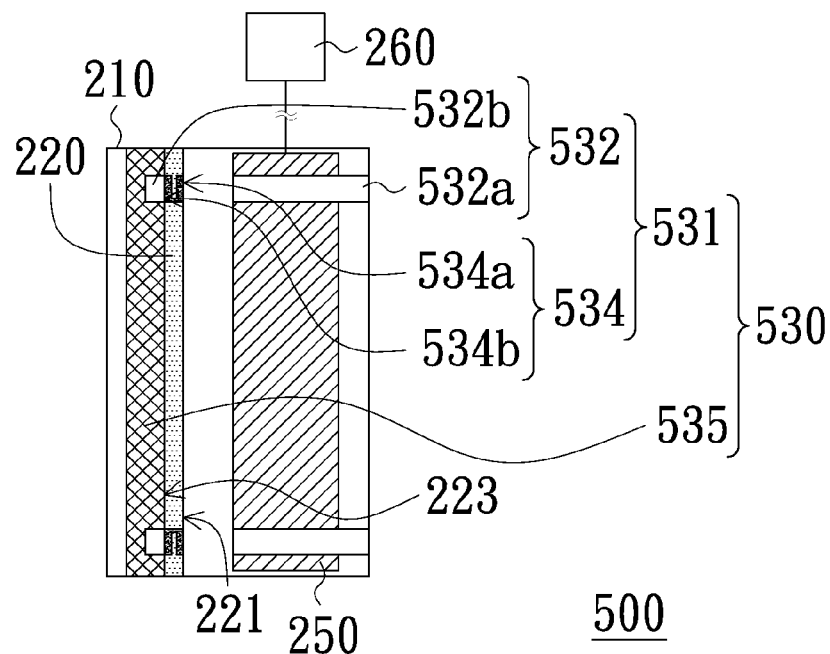
FIG. 8 is a schematic cross-sectional view of an air filter module in accordance with another embodiment of the invention.
Figure 9:
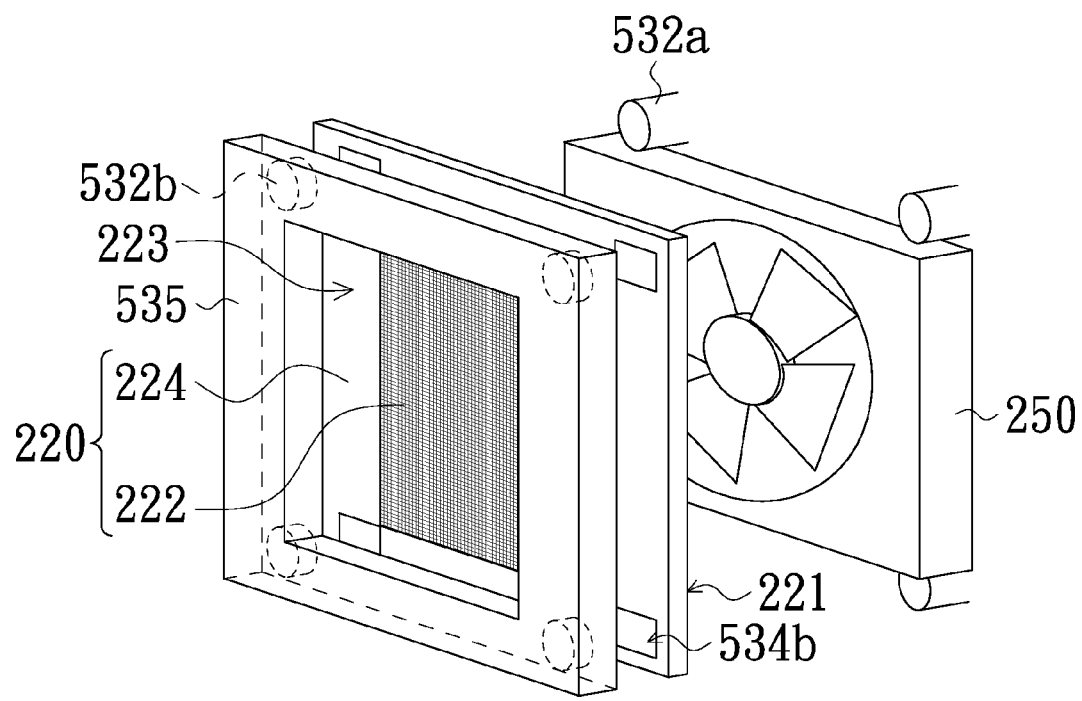
FIG. 9 is a schematic three-dimensional view of the air filter module shown in FIG. 8.

Referring to FIG. 8 and FIG. 9, the air filter module 500 in the embodiment is similar to the air filter module 200; the main difference is the driving force generation assembly. In the cleaning unit 530 of the air filter module 500 according to the embodiment, the driving force generation assembly 531 includes a drive unit 532 and a movement unit 534. The drive unit 532 includes at least one first electromagnet 532a and at least one drive electromagnet 532b. The movement unit 534 includes at least one first metal surface 534a corresponding to the first electromagnet(s) 532a and at least one second metal surface 534b corresponding to the drive electromagnet(s) 532b. In the embodiment, the drive unit 532 is exemplified by having a plurality of first electromagnets 532a and a plurality of drive electromagnets 532b, and the movement unit 534 is exemplified by having a plurality of first metal surfaces 534a and a plurality of second metal surfaces 534b. However, in another embodiment, it is to be noted that the drive unit 532 may have one first electromagnet 532a and one drive electromagnet 532b only, and the movement unit 534 may have one first metal surface 534a and one second metal surface 534b only. In addition, the filter component 220 has a first surface 221 and a second surface 223; wherein the first surface 221 and the second surface 223 are opposite to each other. The first surface 221 faces to the first electromagnet 532a, and the second surface 223 faces to the drive electromagnet 532b. The first metal surface 534a is disposed on the first surface 221, and the second metal surface 534b is disposed on the second surface 223. The drive electromagnet 532b is, for example, fixed to the block component 535 of the cleaning unit 530. The block component 535 is configured to stop the filter component 220. In the embodiment, the block component 535 is, for example, a frame structure so as to expose the filter component 220; however, it is to be noted that the invention does not limit the structure of the block component 535. In addition, the drive electromagnet 532b may be fixed to the housing 210 in the embodiment that the cleaning unit 530 does not include the block component 535. Additionally, in the embodiment, each first metal surface 534a and each second metal surface 534b each may be provided by a metal sheet respectively, and the two metal sheets may be connected to each other or may be separated from each other. In another embodiment, each first metal surface 534a and the corresponding second metal surface 534b respectively are two surfaces of a same metal block embedded in the filter component 220.

Figure 10:
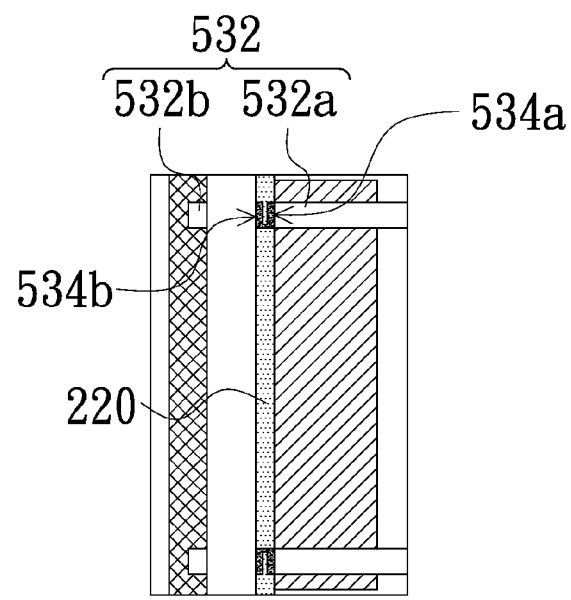
FIG. 10 is an alternative schematic three-dimensional view of the air filter module shown in FIG. 8.

In the embodiment, the filter component 220 is configured to be cleaned through the cleaning unit 530 while having accumulated dust thereon. Specifically, under the status as illustrated in FIG. 8 and when the filter component 220 is cleaned, a current is configured to supply to the first electromagnet 532a of the drive unit 532 according to the cleaning-start signal and the no current is configured to supply to the drive electromagnet 532b. At the same time, the first metal surface 534a is driven toward and attracted by the first electromagnet 532a, and accordingly, the filter component 220 has a movement along with the first metal surface 534a. When the first metal surface 534a and the first electromagnet 532a collide to each other as illustrated in FIG. 10, the dust accordingly falls from the filter component 220. Then, the drive electromagnet 532b of the drive unit 532 is supplied with a current and the first electromagnet 532a is supplied with no current. And thus, the second metal surface 534b is driven toward and attracted by the drive electromagnet 532b, and accordingly the filter component 220 has a movement along with the second metal surface 534b. When the second metal surface 534b and the drive electromagnet 532b collide to each other as illustrated in FIG. 8, the dust accordingly falls from the filter component 220.

Therefore, through repeating the aforementioned operation steps, the air filter module 200 may automatically remove the dust on the filter component 220; and thus, the air filter module 500 according to the embodiment may automatically remove the dust on the filter component 220 efficiently.

Figure 11:
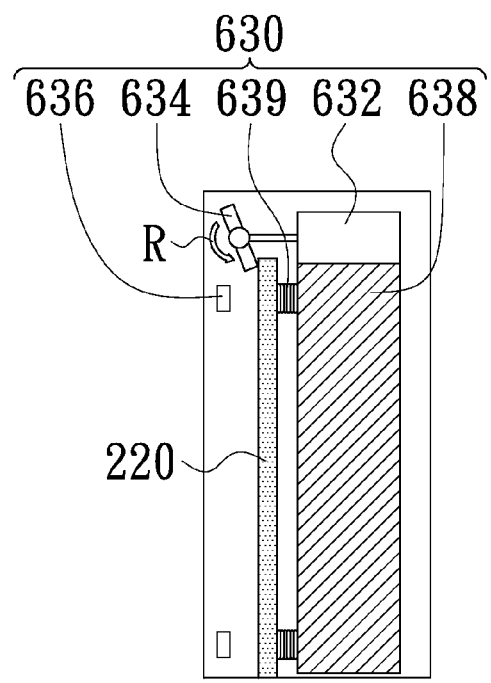
FIG. 11 is a schematic cross-sectional view of an air filter module in accordance with another embodiment of the invention.
Figure 12:
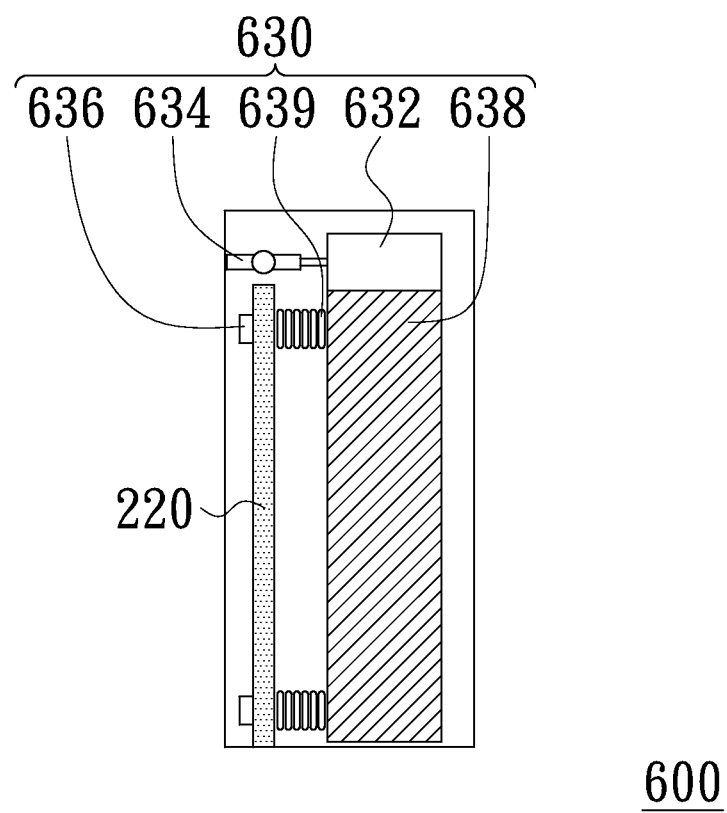
FIG. 12 is an alternative schematic three-dimensional view of the air filter module shown in FIG. 11.

In the above embodiments, the cleaning unit is implemented with a driving force generation assembly; however, it is understood that the cleaning unit may be directly implemented with other types of mechanical structure. Referring to FIGS. 11 and 12, the cleaning unit 630 of the air filter module 600 may include a drive unit 632 and a collision component 634 connected to the drive unit 632, and the collision component 634 is the aforementioned movement unit. The drive unit 632 is configured to drive the collision component 634 so as make the collision component 634 and the filter component 220 collide and thereby removing the dust from the filter component 220. Specifically, the drive unit 632 is, for example, a motor for driving the collision component 634 to have a rotation movement to collide the filter component 220. In addition, the cleaning unit 630 may further include a block component 636, a fan 638, and at least one elastic component 639; it is to be noted that the air filter module 600 in the embodiment is exemplified by having a plurality of elastic components 639. The filter component 220 is disposed between the block component 636 and the drive unit 632. The block component 636 is configured to stop the filter component 220. The elastic component(s) 639 is(are) connected between the filter component 220 and the drive unit 632. The drive unit 632 is immovable.

In addition, as shown in FIG. 11, when the filter component 220 is cleaned, the drive unit 632 is configured, through being supplied with a current according to a cleaning-start signal, to drive the collision component 634 to rotate in a rotation direction R so as to make the dust fall from the filter component 220. When the collision component 634 and the filter component 220 collide, the elastic component 639 is compressed by the filter component 220 as illustrated in FIG. 11. Then, as illustrated in FIG. 12, when the collision component 634 continues to rotate so to depart the filter component 220, the elastic component 639 restores back to the original status without a compression and make the filter component 220 and the block component 636 collide and thereby falling the dust from the filter component 220. The fallen dust is then flown away from the housing 210 and flown toward the outside of the housing 210 by the fan 638.

In the embodiment, the cleaning of the filter component 220 may be achieved through the drive unit 632 keeping driving the collision component 634 to rotate; therefore, the air filter module 600 according to the embodiment may automatically remove the dust on the filter component 220 efficiently.

Therefore, the invention may be summarized to have at least the following advantages:

1. Because the air filter module of the invention includes the cleaning unit for generating collisions between the filter component and the cleaning unit, the dust accumulated on the filter component may be efficiently and automatically removed by the collisions.

2. The projection device of the invention, due to having an air filter module with an automatic dust removal function, may be used more conveniently.

3. In one embodiment, dust may be removed away from the projection device toward the outside of the projection device so as to enhance the automatic dust removal effect of the air filter module through controlling the rotation direction of fans by the control unit.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. In addition, these claims may refer to use "first", "second", etc. following with noun or element. Such terms should be understood as a nomenclature and should not be construed as giving the limitation on the number of the elements modified by such nomenclature unless specific number has been given.

What is claimed is:

1. An air filter module, adapted to be used with a projection module and disposed to cover an air vent of the projection module, the air filter module comprising:
    a filter component, comprising:
        a filter; and
        a frame surrounding the filter; and
    a cleaning unit, disposed to cover the air vent and configured to drive the filter component to move according to a cleaning-start signal, the cleaning unit comprising:
        a block component, configured to stop the filter component; and
        a driving force generation assembly, comprising:
            a drive unit, and a movement unit, fixed on peripheral of the frame between the drive unit and the block component and the movement unit is located outside the filter,
wherein a driving force is generated between the drive unit and the movement unit, for making the movement unit collide with the drive unit directly, wherein collide means creating an impact after a separation between the movement unit and the drive unit.

2. The air filter module according to claim 1, wherein the drive unit comprises at least one electromagnet, the movement unit comprises at least one magnetic device corresponding to the electromagnet(s), each magnetic device is disposed between the filter component and the corresponding electromagnet, the driving force is a magnetic force generated by an interaction between the electromagnet(s) and the magnetic device(s) corresponding to the electromagnet(s).

3. The air filter module according to claim 1, wherein the drive unit comprises at least one electromagnet, the movement unit comprises at least one magnetic device corresponding to the electromagnet(s), the driving force generation assembly further comprises at least one track corresponding to the electromagnet(s), each track is disposed between the filter component and the corresponding electromagnet, and each magnetic device is disposed in the corresponding track.

4. The air filter module according to claim 3, wherein each track comprises a tubular structure.

5. The air filter module according to claim 3, further comprising at least one gasket, each gasket is disposed between the filter component and the corresponding track.

6. The air filter module according to claim 1, wherein the drive unit comprises at least one electromagnet, the movement unit comprises at least one metal device corresponding to the electromagnet(s), each metal device is disposed between the corresponding electromagnet and the filter component, the driving force generation assembly further comprises at least one elastic component corresponding to the electromagnet(s), each elastic component is connected between the corresponding electromagnet and the corresponding metal device.

7. The air filter module according to claim 1, further comprising at least one drive electromagnet fixed to the block component.

8. The air filter module according to claim 7, wherein the drive unit comprises at least one first electromagnet, the movement unit comprises at least one first metal surface corresponding to the first electromagnet(s) and at least one second metal surface corresponding to the drive electromagnet(s), the filter component has a first surface and a second surface, the first surface and the second surface are opposite to each other, the first surface faces to the first electromagnet(s), the second surface faces to the drive electromagnet(s), the first metal surface(s) is(are) disposed on the first surface of the filter component, and the second metal surface(s) is(are) disposed on the second surface of the filter component.

9. The air filter module according to claim 1, further comprising:
a fan; and
a control unit electrically connected to the fan and configured to control a rotation direction of the fan.

10. The air filter module according to claim 1, wherein the frame collides with the block component along a first direction and the frame collides with the drive unit along a second direction opposing to the first direction.

11. The air filter module according to claim 10, wherein the filter is propelled in the first direction or the second direction.

12. A projection device, comprising:
a projection module comprising an air vent; and
an air filter module disposed to cover the air vent, the air filter module comprising:
a filter component, comprising:
a filter; and
a frame surrounding the filter; and
a cleaning unit disposed to cover the air vent and configured to drive the filter component to move according to a cleaning-start signal, the cleaning unit comprising:
a block component, configured to stop the filter component; and
a driving force generation assembly, comprising:
a drive unit, and
a movement unit, fixed on peripheral of the frame between the drive unit and the block component and the movement unit is located outside the filter,
wherein a driving force is generated between the drive unit and the movement unit, for making the movement unit collide with the drive unit directly, wherein collide means creating an impact after a separation between the movement unit and the drive unit.

13. The projection device according to claim 12, wherein the drive unit comprises at least one electromagnet, the movement unit comprises at least one magnetic device corresponding to the electromagnet(s), each magnetic device is disposed between the filter component and the corresponding electromagnet, the driving force is a magnetic force generated by an interaction between the electromagnet(s) and the magnetic device(s) corresponding to the electromagnet(s).

14. The projection device according to claim 12, wherein the drive unit comprises at least one electromagnet, the movement unit comprises at least one magnetic device corresponding to the electromagnet(s), the driving force generation assembly further comprises at least one track corresponding to the electromagnet(s), each track is disposed between the filter component and the corresponding electromagnet, and each magnetic device is disposed in the corresponding track.

15. The projection device according to claim 14, wherein each track comprises a tubular structure.

16. The projection device according to claim 14, wherein the air filter module further comprises at least one gasket, each gasket is disposed between the filter component and the corresponding track.

17. The projection device according to claim 12, wherein the drive unit comprises at least one electromagnet, the movement unit comprises at least one metal device corresponding to the electromagnet(s), each metal device is disposed between the corresponding electromagnet and the filter component, the driving force generation assembly further comprises at least one elastic component corresponding to the electromagnet(s), each elastic component is connected between the corresponding electromagnet and the corresponding metal device.

18. The projection device according to claim 12, wherein the air filter module further comprises at least one drive electromagnet fixed to the block component.

19. The projection device according to claim 18, wherein the drive unit comprises at least one first electromagnet, the movement unit comprises at least one first metal surface corresponding to the first electromagnet(s) and at least one second metal surface corresponding to the drive electromagnet(s), the filter component has a first surface and a second surface, the first surface and the second surface are opposite to each other, the first surface faces to the first electromagnet(s), the second surface faces to the drive electromagnet(s), the first metal surface(s) is(are) disposed on the first surface of the filter component, and the second metal surface(s) is(are) disposed on the second surface of the filter component.

20. The projection device according to claim 12, wherein the air filter module further comprises:
   a fan; and
   a control unit electrically connected to the fan and configured to control a rotation direction of the fan.

* * * * *